Jan. 25, 1966   R. L. CARLSTEDT   3,230,997
TIRE STUD

Filed May 18, 1964   2 Sheets-Sheet 1

INVENTOR.
RAGNAR L. CARLSTEDT
BY Toulmin & Toulmin
ATTORNEYS

Jan. 25, 1966   R. L. CARLSTEDT   3,230,997
TIRE STUD

Filed May 18, 1964   2 Sheets-Sheet 2

INVENTOR.
RAGNAR L. CARLSTEDT
BY Toulmin & Toulmin
ATTORNEYS 3,230,997
TIRE STUD
Ragnar L. Carlstedt, Valley Heights, Pa., assignor to Kennametal, Inc., Latrobe, Pa., a corporation of Pennsylvania
Filed May 18, 1964, Ser. No. 367,949
10 Claims. (Cl. 152—210)

This invention relates to anti-skid tires and studs for placing into the threads of tires for giving them anti-skid properties.

It has long been known that the anti-skid properties of automotive tires could be substantially increased by putting in the treads of the tires which would grip snow and ice as the tire is rolled over a surface of this nature so that the tractive effort of the tire was not dependent solely upon frictional engagement.

On hard packed snow and ice no tire, including tires with snow treads, can develop any particular traction. The surface is hard and unyielding and thus offers no opportunity for the tread pattern to bite into the surface and, in addition, under certain temperature conditions the pressure with which the tire engages the snow or ice will cause melting at the tire surface, and this then forms a liquid lubricant so that traction can be very low indeed under such circumstances.

While the placing of studs in tire treads as referred to has long been known and has long been practiced, it is only recently that certain critical limitations in connection with the use of the studs has been established. The studs, must, of course, be firmly retained within the tread, and it has been found that this can best be accomplished by drilling blind holes in the tread and inserting headed studs into the holes so that the studs protrude slightly from the tire tread.

The drilling of blind holes in the tread of the tire and then placing the studs therein is to be preferred over molding the tread over the studs which could, of course, be done because much firmer support for the studs is possible when they are put in drilled holes. This comes about because the holes are drilled substantially smaller than the studs and the tread rubber surrounding the studs is thus in a condition of compression and supports the studs. Furthermore, with such a drilled hole, the periphery of the head of the stud can be made sharp and it will tend to bit into the rubber and cut the rubber, thus providing good holding power against the stud pulling out of the tread rubber.

It has been found however that when a stud with a head thereon of an adequate size to give a substantial margin of safety against pulling out is placed in the rubber of a tread, the stud presents substantial resistance to being pushed into the tire and if this resistance gets above a certain amount, it becomes a disadvantage. The reason that a high resistance to inward movement of the stud in the tread is a disadvantage is that if the stud has no resilience in the radially inward direction, it will wear rapidly as the tire rolls on a road surface and will lose the protrusion from the tread and will thus be defective for gripping a surface. Inasmuch as tread rubber will vary in resilience, it follows that the control of the resilience of the stud in the radially inward direction has heretofore been quite difficult.

Studs of the nature referred to employ a wear resistant pin mounted in a body, the pin being an extremely hard material such as cemented tungsten carbide while the body has been formed of steel or aluminum or plastic-like material. The steel body has proved to be superior because aluminum wears too rapidly from grit over which the tire rolls, while the plastic-like bodies have exhibited the characteristic of deteriorating in the presence of heat which has developed as the tires roll on a road surface, and particularly, under a condition of skidding at which time the studs can become extremely hot. A steel body or a material having similar wearing characteristics is thus preferred over other materials that have been tried.

The inserted carbide pin is usually brazed or bonded to the body of the stud with a chemical adhesive to join the stud to the body with sufficient strength to prevent the pin from being lost from the body or becoming loose in the body from the impacts of the stud on a roadway. I have discovered that a tapered pin pressed into a stud tightly fixes the pin in the body of the stud and retains the pin tightly joined to the stud body throughout the life of the tire.

With the foregoing general comments in mind, it will be understood that the object of the present invention is the provision of an improved stud for being placed in the tread portion of tires to impart anti-skidding characteristics to the tire.

Another object of this invention is the provision of an improved method of fixing a cemented carbide pin in the body of the stud so that it can be cheaply accomplished but wherein extremely secure fixing of the carbide pin in the body results.

Another object of this invention is the provision of a stud for being placed in the tread of a tire which will hold tightly into the tread rubber, but in connection with which the resistance of the stud to being pushed radially inwardly in the tread can be controlled.

A still further object of this invention is the provision of an anti-skid tire stud in which the stud is prevented from rotating in the tread rubber which could lead to wearing out of the body of the stud and loss of the stud from the tire.

These and other objects and advantages of this invention will become more apparent upon reference to the following specification taken in connection with the accompanying drawings, in which.

Figure 1:
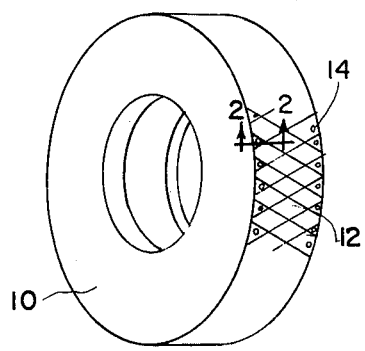
FIGURE 1 is a perspective view showing the general appearance of a tire having studs according to the present invention therein.

Referring to the drawings somewhat more in detail, tire 10 in FIGURE 1 has a tread portion 12 of any conventional structure and design and which may be a snow tread with coarse grid formations thereon, or which may be of more conventional general popular design. In any case, there are arranged around the tread portion of the tire and, preferably along the opposite edges thereof, a plurality of rows of studs 14. The stud, as will be seen in FIGURE 2, comprises a body portion 16 and an inserted pin portion 18. The body portion 16 has a head 20 at its inner end for retaining it in the tread rubber. The stud is inserted in the tread by boring a blind hole (see FIGURE 3) in the tread at the desired location and then forcing the stud into the hole.

Figure 2:
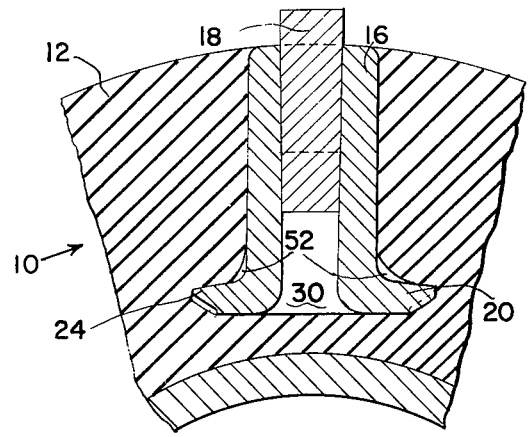
FIGURE 2 is a sectional view indicated by line 2—2 on FIGURE 1 and showing the appearance of a stud when imbedded in the rubber of a tire tread.
Figure 4:
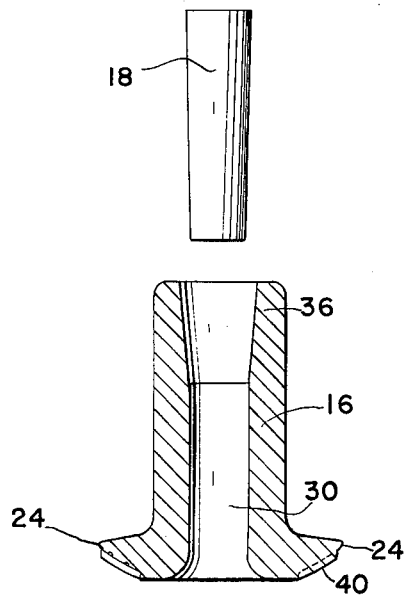
FIGURE 4 is a view showing the body of the stud and the carbide pin immediately prior to assembling thereof.
Figure 3:
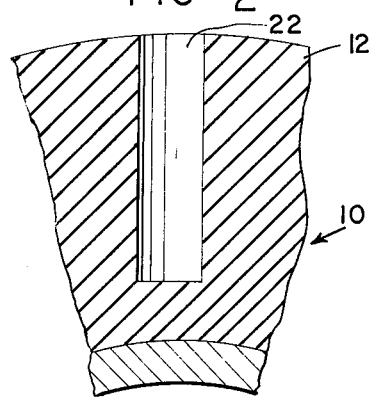
FIGURE 3 is a sectional view like FIGURE 2 but shows the blind hole drilled in the tire tread prior to placing the stud therein.

In FIGURE 3 the hole 22 has about the proper dimensions for receiving a stud of the size illustrated in FIGURE 2.

The shape of the head is not of particular importance because a tool is employed which opens hole 22 up before the stud is pushed into the hole, and upon withdrawing the tool then flows back around the stud and the sharp peripheral edge portion 24 around the head cuts into the rubber so that the stud is tightly held in place.

Figure 5:
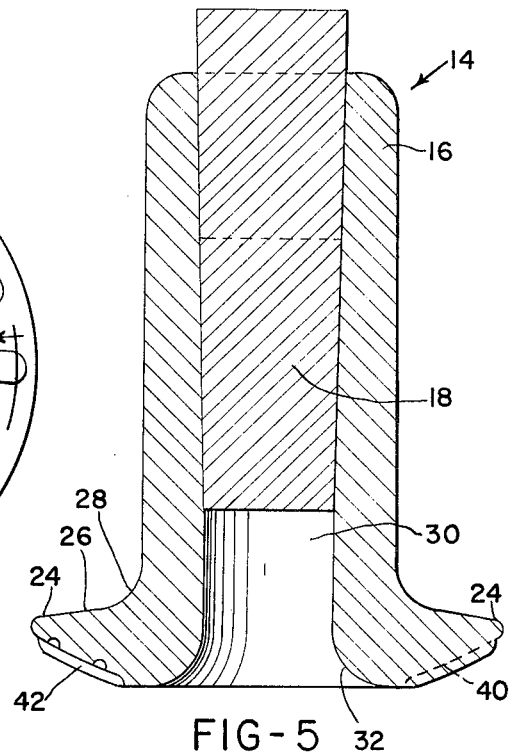
FIGURE 5 is a vertical sectional view through the stud drawn at enlarged scale.

The stud is shown more in detail in FIGURE 5 wherein it will be noted that the head comprises an upper surface 26, preferably inclined upwardly about 8° but which could also be flat. As will be seen in FIGURE 2 the rubber in flowing back around the head takes a curve indicated at 28 so that it is only the outer portion of the head that is wholly effective for holding the stud in the tread. For this reason the head must have a substantial area to gain the factor of safety necessary.

On account of the size of the head, considerable resistance to inward movement of the stud in the tire is encountered and, as mentioned before, this can lead to the stud wearing off too rapidly and losing its protrusion from the tread and becoming defective as an anti-skid element. According to the present invention, the center hole 30 in the body of the stud extends completely therethrough and has its end adjacent the head 20 flared out as at 32. The hole running completely through the body of the stud reduces the area of engagement of the stud head with the tread rubber and the flaring of the head at 32 can still further reduce this area of engagement so that, while the stud is tightly and firmly held in the tread rubber by the head, it is still resiliently supported with respect to inward movement in the tread rubber and the amount of resilience is controllable by controlling the nature of the flared out portion 32.

The extending of bore 30 completely through the stud body has an additional advantage in that the carbide pin 18 is tapered, being provided with a taper of from two to three degrees included angle so that it can be forced into bore 30 and will stick in the bore. The carbide pin is extremely hard, however, and may roll shavings up from the bore and, if the bore were to be a blind bore, defective fitting of the pin in the bore could result unless the pins were made to extremely accurate size. This could possibly even involve expensive sorting of the pins and matching of the pins to sorted stud bodies. By extending bore 30 completely through the body, however, extremely critical size limitations of pins 18 are completely eliminated and the pin having the proper taper can always be properly fitted in the bore in the stud body. This fitting can be done solely by force, but it is also contemplated to heat the stud body and push the pin into it so that upon cooling of the stud body the pin will be shrink fitted to the bore. It has been found that even with pushing the pin in purely by force, up to 750 or 800 pounds is required to pull the pin out of the bore.

Figure 11:
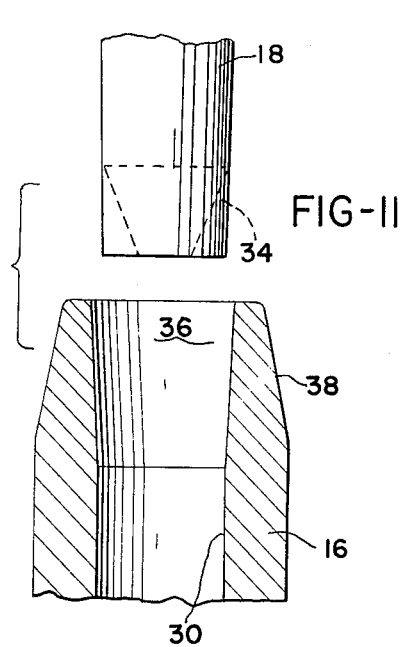
FIGURE 11 is a fragmentary view showing that the end of the stud body could be tapered.
Figure 7:
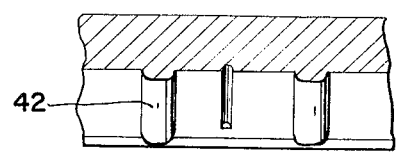
FIGURE 7 is a fragmentary sectional view indicated by line 7—7 on FIGURE 6.

It is found of advantage to provide pin 18 with a tapered lead end 34 to facilitate inserting of the pin into the bore or, preferably, to provide an enlarged portion 36 at the upper end of bore 30 which will pilot the pin into the bore, and which will also substantially eliminate any tendency for the upper end of the stud to split on account of expansion thereof by the pin. This last-mentioned factor is of importance because the extreme outer end of the stud body may be tapered as at 38 (FIGURE 11) because this will prevent riveting over of the metal of the stud body during the initial running period of the tire. When this occurs the end of the stud body mushrooms outwardly of the body and inferior results are obtained. By providing the end of the body with a taper, however, this mushrooming or riveting is prevented, and instead, the metal of the stud body will wear down and leave a portion of the carbide pin exposed at all times.

It has been found advantageous to provide the lower side 40 of the head 20 of the stud body with ribs or the like as indicated at 42 which will assist in preventing the stud from rotating in the tread rubber as it is deflected due to the tire rolling on a roadway. These raised portions may be in the form of ribs or may consist of raised or recessed printing on the head of the stud or both.

Figure 8:
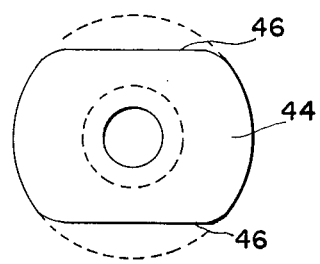
FIGURE 8 is a view similar to FIGURE 6 but showing how the stud head could be made other than circular so as to impart anti-rotating characteristics thereto.

Another way of preventing the stud from rotating is illustrated in FIGURE 8 wherein head 44 of the body of the stud is not circular, which may be accomplished by forming the stud with one or more flats 46, as on opposite sides thereof. These flat regions prevent the stud from rotating in the tread rubber and additionally can be employed for imparting different degrees of resilience to tilting of the stud in different directions. If the flats extend transversely of the tire, for example, the stud will tilt more easily in the fore and aft direction than laterally; whereas, if the flats extend in the direction of rotation of the tire, the stud will tilt laterally more easily than in the fore and aft direction.

Figure 9:
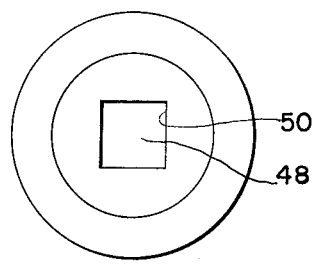
FIGURE 9 is a cross sectional view through a stud showing a pin other than circular could be employed in the stud.
Figure 6:
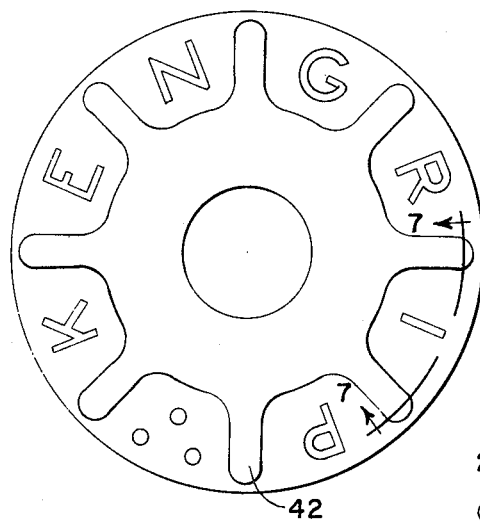
FIGURE 6 is a view looking in at the head end of the stud showing how the head of the stud could be provided with anti-rotating ribs or like configurations.

The carbide pin 18 has been illustrated as round and tapered in a longitudinal direction. The pin could, of course, be straight, and in this case the connection thereof with the stud body could be by brazing or cementing, which has been the practice heretofore for connecting straight pins with stud bodies. I have found, however, that straight pins can be firmly fixed in the bodies by heating the bodies and then inserting the pins and then permitting the bodies to cool, whereupon extremely tight shrink fit is obtained that holds the pins tightly in the body. For pins of uniform cross section an extrusion process can be employed, but when the pins are tapered they are formed by compacting the powder from which they are made in a suitable mold cavity. In either case, the pin can have a square cross section or any other cross section different from solid round as indicated at 48 in FIGURE 9. The central bore 50 in the body of the stud of FIGURE 9 and which bore goes completely through the stud, is pierced in the stud and can thus be square or any other desired shape as well as round.

Turning for the moment to FIGURE 2, it will be seen that the tread rubber in forming around the head of the stud may not flow completely into the corner formed where the top annular surface of the head of the body meets the shank portion thereof. The resulting space between the rubber and the stud is indicated at 52 in FIGURE 2. This space, although not particularly important, represents a region where there is no bearing between the stud, and thus makes a portion of the stud head ineffective for preventing stud pull out, and a portion of the shank of the stud is ineffective for inhibiting tilting of the stud in the tire.

The head of the stud, however, could be so shaped so that the tread rubber will engage the entire surface of the stud body from the outer periphery of the head across the top portion thereof and so along the full length of the shank of the stud. The head has a sharp peripheral portion that cuts into the rubber, but the upper side of the head could have a substantial curve so as to conform with the shape assumed by the tread rubber after the stud is fit in place in the tread.

With respect to some particular values that have been established, the body of the stud may have a shank portion about .190′ in diameter, whereas the diameter of the head portion is about .355′.

The carbide pin is about .119′ in diameter at its larger end and is about ⅜ of an inch long and the body is about ½ inch long. Initial protrusion of the pin from the pin end of the body is about 1/16 inch.

When a tapered pin is employed the bore 30 can be straight and when the pin is driven into place, the body will taper somewhat to conform to the taper of the pin. It will be appreciated that with the bore 30 extending completely through the stud body, the impacting of the stud on a roadway will in no way tend to loosen the stud in the body, but will tend to maintain it driven into secure engagement with the stud body at all times.

While it is possible to form the bore 30 to a taper conforming to that of the pin, it is somewhat simpler to form the bore 30 straight, and it is preferable to have the enlarged diameter portion 36, either tapered or counterbored, to pilot the pin into the bore and to prevent the upper end of the stud from splitting when it expands due to the tapered pin being driven into the bore.

Steel is the preferred material for the stud body and this includes stainless steel, which has the advantage of not requiring any plating of the stud. The possibility of other materials such as plastic, reinforced plastic, plastic bonded fiberglass, and glass itself are not excluded as possible materials for the stud body provided the characteristics thereof are substantially equivalent to that of steel in respect to heat resistance, strength and wear qualities.

Figure 10:
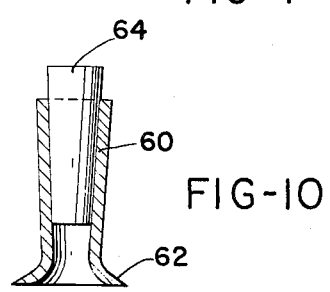
FIGURE 10 is a view showing a stud having a body formed from tubing.

FIGURE 10 shows a length of tubing such as stainless steel could constitute the stud body 60 and have a head 62 with a sharp periphery thereon formed on one end, as by a cold header. Tapered carbide pin 64 is driven into the end of the body opposite the head, as before, and this will taper the body and firmly fix the pin in the body.

It will be understood that this invention is susceptible to modification in order to adapt it to different usages and conditions; and accordingly, it is desired to comprehend such modifications within this invention as may fall within the scope of the appended claims.

What is claimed is:

1. A tire stud comprising; a tubular body, a single head on one end of the body integral therewith and projecting radially therefrom, said body having a uniform diameter from the head end thereof to the opposite end thereof, and a hard wear resistant pin fixed in the bore in the body and protruding axially therefrom at the end opposite said head, said pin extending only partway through said bore, said bore extending axially completely through said body and head said pin tapering inwardly slightly from its protruding end to its inner end and being fixedly wedged in the bore in the body by driving the pin small end foremost axially into the bore at the end thereof opposite said head, one of the inner end of the pin and the end of the bore into which the pin is introduced being formed with a tapered pilot portion to facilitate starting the pin into the bore.

2. A tire stud comprising; a tubular body, a single head on one end of the body integral therewith and projecting radially therefrom, said body having a uniform diameter from the head end thereof to the opposite end thereof, and a hard wear resistant pin fixed in the bore in the body and protruding axially therefrom at the end opposite said head, said pin extending only partway through said bore, said bore extending axially completely through said body and head said pin tapering inwardly slightly from its protruding end to its inner end and being fixedly wedged in the bore in the body by driving the pin small end foremost axially into the bore at the end thereof opposite said head, the end of the bore into which the pin is introduced being slightly flared to provide a pilot region to start the pin into the bore while reducing the possibility of splitting the body when the tapered pin is driven into it.

3. A tire stud comprising; a tubular body, a single head on one end of the body integral therewith and projecting radially therefrom, said body having a uniform diameter from the head end thereof to the opposite end thereof, and a hard wear resistant pin fixed in the bore in the body and protruding axially therefrom at the end opposite said head, said pin extending only partway through said bore, said bore extending axially completely through said body and head said pin tapering inwardly slightly from its protruding end to its inner end and being fixedly wedged in the bore in the body by driving the pin small end foremost axially into the bore at the end thereof opposite said head, the end of the bore into which the pin is introduced being slightly flared to provide a pilot region to start the pin into the bore while reducing the possibility of splitting the body when the tapered pin is driven into it, the outer portion of said body at the pin end thereof tapering inwardly toward the pin end of the body to prevent the body mushrooming in use when placed in a tire tread.

4. A tire stud comprising; a body consisting of a shank of substantially uniform diameter from end to end, a single disc-like head integral with said shank at one extreme end thereof and projecting radially from said shank, bore means in said body extending on the axis of said shank and including a first portion extending axially into said shank from the end thereof opposite the head end to receive a pin and a second porton extending axially into the shank from the head end thereof to form a cavity to receive tread material displaced when the stud is pressed inwardly of a tire in which the stud is mounted head end foremost in a blind hole in the tire tread, a hard wear resistant pin fixed in said first portion of said bore means and protruding axially from said shank from the end thereof opposite the head end, said pin tapering inwardly slightly from its protruding end to its other end and being fixedly wedged in said first portion of the bore means by driving the pin therein small end foremost, the end of said first portion of said bore means into which said pin is introduced being slightly flared to provide a pilot region to start the pin into the said first portion of the bore means.

5. A tire stud according to claim 4, wherein said second portion of said bore means flares outwardly toward the head end of the stud to reduce the area of the head engaging the tread rubber at the bottom of a blind hole in a tread in which the stud is placed.

6. A tire stud according to claim 4, wherein said head, on the side toward the pin end of the body is inclined upwardly from the periphery of the head toward the axis of the body so as to be closely embraced by the rubber of the tread in which the stud is placed.

7. A tire stud according to claim 4 which includes means formed on said head to grippingly engage the rubber of a tire tread in which the stud is mounted to inhibit rotation of the stud.

8. A tire stud according to claim 4 in which said body is metal and said pin is cemented tungsten carbide.

9. In combination; a tire having a rubber-like tread, a plurality of substantially radial bores in the tread extending from the tread surface into but not through the rubber of the tread and disposed laterally of the cetnral region of the tread, and a stud in each bore having a straight cylindrical shank portion with a diameter which is substantially greater than the diameter of said hole whereby the tread rubber is compressed around the stud, said shank portion at its outer end terminating in the region of the surface of the tread, said stud having a single head on the inner end of the shank portion integral therewith and extending radially outwardly therefrom and having a sharp periphery so as to bite into the tread rubber, said head bearing on the bottom wall of said blind hole, axial bore means extending in said stud and including at least a first portion extending axially into said shank portion from the outer end thereof and a second portion extending into the inner end of said shank portion, and a hard wear resistant pin press fitted in said bore means from the end of the stud opposite the head end thereof, a portion of said pin projecting from the outer end of said shank portion, said pin terminating in the bore means a substantial distance from the head end of the bore means, said pin being tapered and being inserted in said bore means small end foremost and fixedly wedged into said bore means, said bore means tapering outwardly slightly toward the end thereof opposite said head in at least the terminal region of the bore means so that the pin can be press fitted into the bore means with an interference fit the entire length of the pin without splitting said shank portion of the stud.

10. A tire stud comprising; a body consisting of a shank and a single head on the shank at one end thereof projecting radially from the shank, a hard wear resistant pin extending axially into said shank from the end thereof opposite said head, said pin at its inner end terminating in said shank short of the head end thereof and at its outer end protruding from said shank, and a cavity substantially coaxial with said pin and extending axially into said body at the head end of said shank, said stud being adapted to be placed head end foremost in a blind hole in a tire tread with the said head at the extreme bottom of the hole and with the pin end of the shank of the stud body protruding slightly from the outer surface of the tread, said cavity forming a space into which material of the tire tread at the bottom of said hole will be displaced when said stud is pressed into the tread by engagement of the tire with a road surface whereby the cavity provides means for limiting the radially inwardly directed force required to press the stud inwardly of the tread while said head can be made large enough to prevent the stud from being pulled out of the tread by any radially outwardly directed force less than a predetermined substantial amount.

References Cited by the Examiner

UNITED STATES PATENTS

| | | | |
|---|---|---|---|
| 935,331 | 9/1909 | Stimpson | 152—210 |
| 2,467,418 | 4/1949 | Alexiadis | 152—210 |
| 2,652,876 | 9/1953 | Eisner | 152—210 |
| 2,819,750 | 1/1958 | Langton | 152—210 X |
| 2,982,325 | 5/1961 | Pellaton | 152—210 |
| 3,125,147 | 3/1964 | Hakka | 152/210 |

FOREIGN PATENTS

| | | |
|---|---|---|
| 410,347 | 5/1910 | France. |
| 1,342,598 | 12/1962 | France. |

ARTHUR L. LA POINT, *Primary Examiner.*

C. W. HAEFELE, *Assistant Examiner.*